United States Patent [19]
Peeples et al.

[11] Patent Number: 6,076,485
[45] Date of Patent: Jun. 20, 2000

[54] PET CARRIER

[75] Inventors: Kathleen G. Peeples, Houston, Tex.; Barry Wingate, San Jose, Calif.

[73] Assignee: Igloo Products Corp., Houston, Tex.

[21] Appl. No.: 09/111,200

[22] Filed: Jul. 7, 1998

[51] Int. Cl.[7] .............................. A01K 1/00; A01K 1/03
[52] U.S. Cl. .................... 119/497; 119/496; 119/498; 119/500; 190/107; 190/108
[58] Field of Search ........................ 119/497, 496, 119/498, 500, 474, 453; D30/108, 109; 190/107, 108, 114, 127, 102

[56] References Cited

U.S. PATENT DOCUMENTS

| D. 387,508 | 12/1997 | Van Engers | D30/109 |
|---|---|---|---|
| 1,028,168 | 6/1912 | Williams | 190/127 |
| 1,084,360 | 1/1914 | Rahm | 190/108 |
| 1,403,476 | 1/1922 | Axelman | 190/127 |
| 2,538,778 | 1/1951 | Halpin | 119/497 |
| 3,173,465 | 3/1965 | Pastini | 150/108 |
| 3,280,796 | 10/1966 | Hatcher | 119/499 |
| 3,481,311 | 12/1969 | Schluttig | 119/497 |
| 3,994,372 | 11/1976 | Geller et al. | 190/107 |
| 4,195,593 | 4/1980 | Dunn | 119/499 |
| 4,220,119 | 9/1980 | Albright | 119/497 |
| 4,397,398 | 8/1983 | Watanabe | 220/7 |
| 4,527,512 | 7/1985 | Sugiura | 119/19 |
| 4,977,857 | 12/1990 | Slawinski | 119/497 |
| 5,016,570 | 5/1991 | Henson | 119/497 |
| 5,078,096 | 1/1992 | Bishop et al. | 119/497 |
| 5,081,956 | 1/1992 | Greitzer et al. | 119/500 |
| 5,121,710 | 6/1992 | Gonzalez | 119/498 |
| 5,253,612 | 10/1993 | Goetz | 119/496 |
| 5,485,805 | 1/1996 | Meissner | 119/496 |
| 5,620,069 | 4/1997 | Hurwitz | 190/107 |
| 5,669,331 | 9/1997 | Richmond | 119/497 |
| 5,671,697 | 9/1997 | Rutman | 119/473 |
| 5,671,698 | 9/1997 | Farrugia | 119/497 |
| 5,941,195 | 8/1999 | Martz | 119/497 |

FOREIGN PATENT DOCUMENTS

| 2035034A | 6/1980 | United Kingdom . |
|---|---|---|
| 2101563A | 1/1983 | United Kingdom . |

*Primary Examiner*—Peter M. Poon
*Assistant Examiner*—Judith A. Nelson
*Attorney, Agent, or Firm*—Duane, Morris & Heckscher LLP

[57] ABSTRACT

A collapsible pet carrier of lightweight construction is disclosed. The endwalls are foldable onto the bottom, with the sidewalls foldable around the endwalls, allowing the straps to hold the bundle together when not in use. The carrier can be quickly assembled by pivoting the endwalls upwardly and fastening them to the sidewalls and securing the handles to each other. An optional storage pouch can be incorporated into the handle system and various windows in the side or endwalls can be provided to facilitate ventilation.

21 Claims, 8 Drawing Sheets

PET CARRIER

FIELD OF THE INVENTION

The field of this invention relates to lightweight pet carriers which have the capability of collapsing for storage.

BACKGROUND OF THE INVENTION

Pet carriers have been in use for some time. There are several significant design criteria for an effective pet carrier. The carrier must be structurally strong enough to contain the pet, while at the same time be sufficiently light so that the combination of carrier and pet can be easily handled by the owner. Another design criteria is to be able to collapse the carrier when not in use so that it takes up very little storage space. Pet carriers in the past have addressed one of these criteria but have failed to provide a design which effectively addresses them all. U.S. Pat. No. 5,669,331 shows a rigid pet carrier with collapsible sidewalls which has the appearance of a suitcase when folded up. Apart from the disadvantage of weight, such design also suffers from needless complexity which, over time, will ensure operational difficulties with the collapsing sidewalls due to the numerous fold locations and pivots required to effectively collapse the sidewall. U.S. Pat. No. 5,672,697 illustrates a rigid pet carrier having two sections which telescope with respect to each other so that the volume of the pet carrier can be enlarged or reduced to contain animals of different sizes. U.S. Pat. No. 5,671,698 illustrates a pet carrier with mesh sidewalls which is non-collapsing. U.S. Pat. No. 5,253,612 illustrates a rigid stackable pet carrier. U.S. Pat. Nos. 3,280,79; 5,121,710; 5,081,956; and 4,159,593 illustrate portable doghouses. U.S. Pat. No. 4,220,119 illustrates a pet carrier which, upon unlatching of an internal frame member, allows the endwalls to fold on themselves along a vertical fold.

One of the objectives of the present invention is to provide a lightweight pet carrier that can be collapsed to a very small size and easily stored. Another objective of the present invention is to provide a design which can be assembled for use quickly and provide comfort for the pet when in use. Another objective of the present invention is to provide additional features which allow accommodation of a companion storage pouch for holding pet-related items or items owned by the owner, as well as various windows or openings to allow ventilation in the carrier for the comfort of the pet. These and other objectives can be more readily seen by an examination of the detailed description of the preferred embodiment below.

SUMMARY OF THE INVENTION

A collapsible pet carrier of lightweight construction is disclosed. The endwalls are foldable onto the bottom, with the sidewalls foldable around the endwalls, allowing the straps to hold the bundle together when not in use. The carrier can be quickly assembled by pivoting the endwalls upwardly and fastening them to the sidewalls and securing the handles to each other. An optional storage pouch can be incorporated into the handle system and various windows in the side or endwalls can be provided to facilitate ventilation.

DETAILED DESCRIPTION OF THE PREFERRED EMBODIMENT

Figure 1:
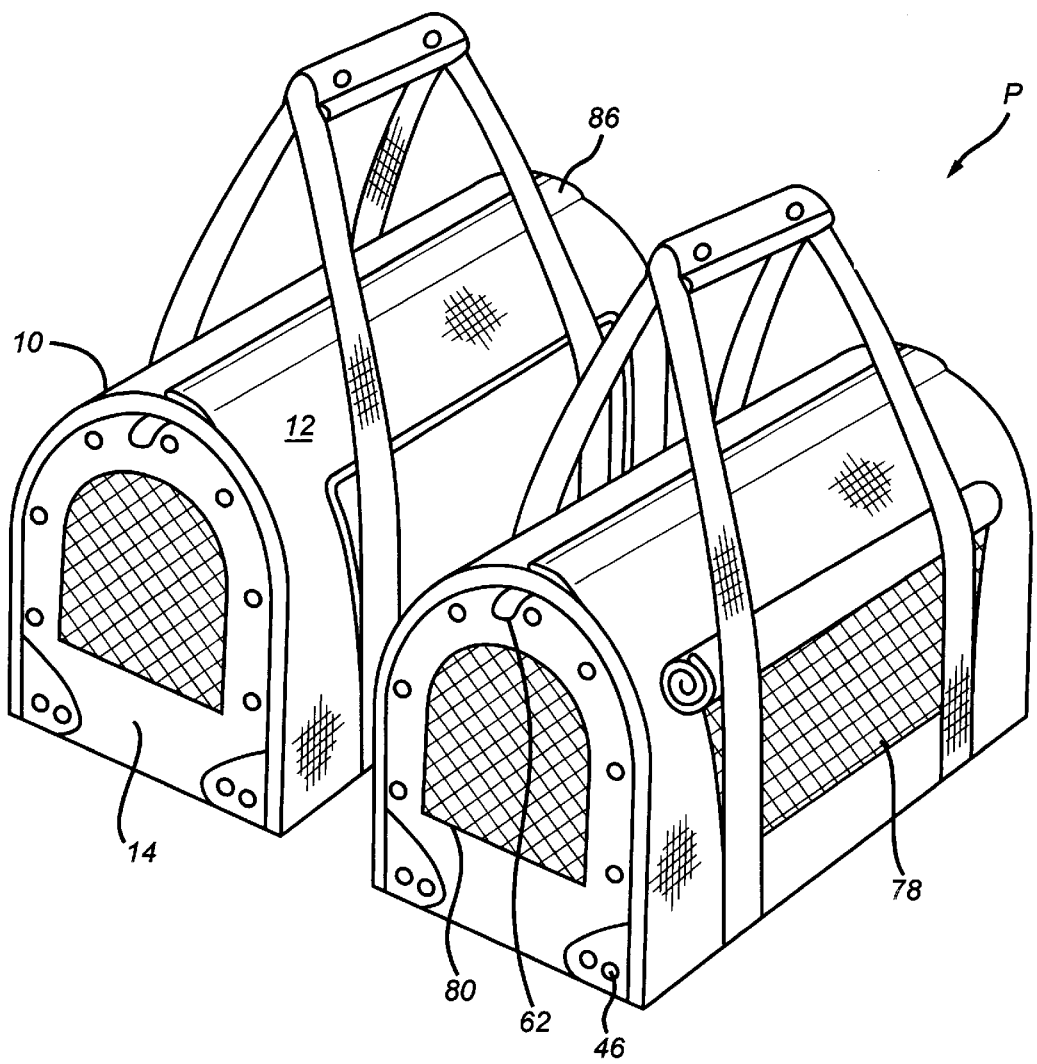
FIG. 1 illustrates the pet carrier showing a sidewall flap in the rolled-down and rolled-up positions.

The overall structure of the pet carrier P is shown in FIG. 1. It comprises sidewalls 10 and 12 and endwalls 14 and 16 (see FIG. 2). Sidewalls 10 and 12 are an extension of bottom 18. Bottom 18 has loops 20 and 22 through which extends a continuous strap 24. A handle 26 is formed out of a rectangular piece of material having a plurality of snaps 28, which is secured to end 30 of strap 24. The opposite end 32, when held adjacent end 30, can be secured to it by wrapping the handle 26 around ends 30 and 32 and fastening the snaps 28. This position is illustrated for the collapsed condition of the pet carrier P in FIG. 5. Referring again to FIG. 2, the bottom 18 has a plurality of feet 34 distributed at its four comers to keep the bottom 18 off the ground when the pet carrier P is set down.

Figure 2:
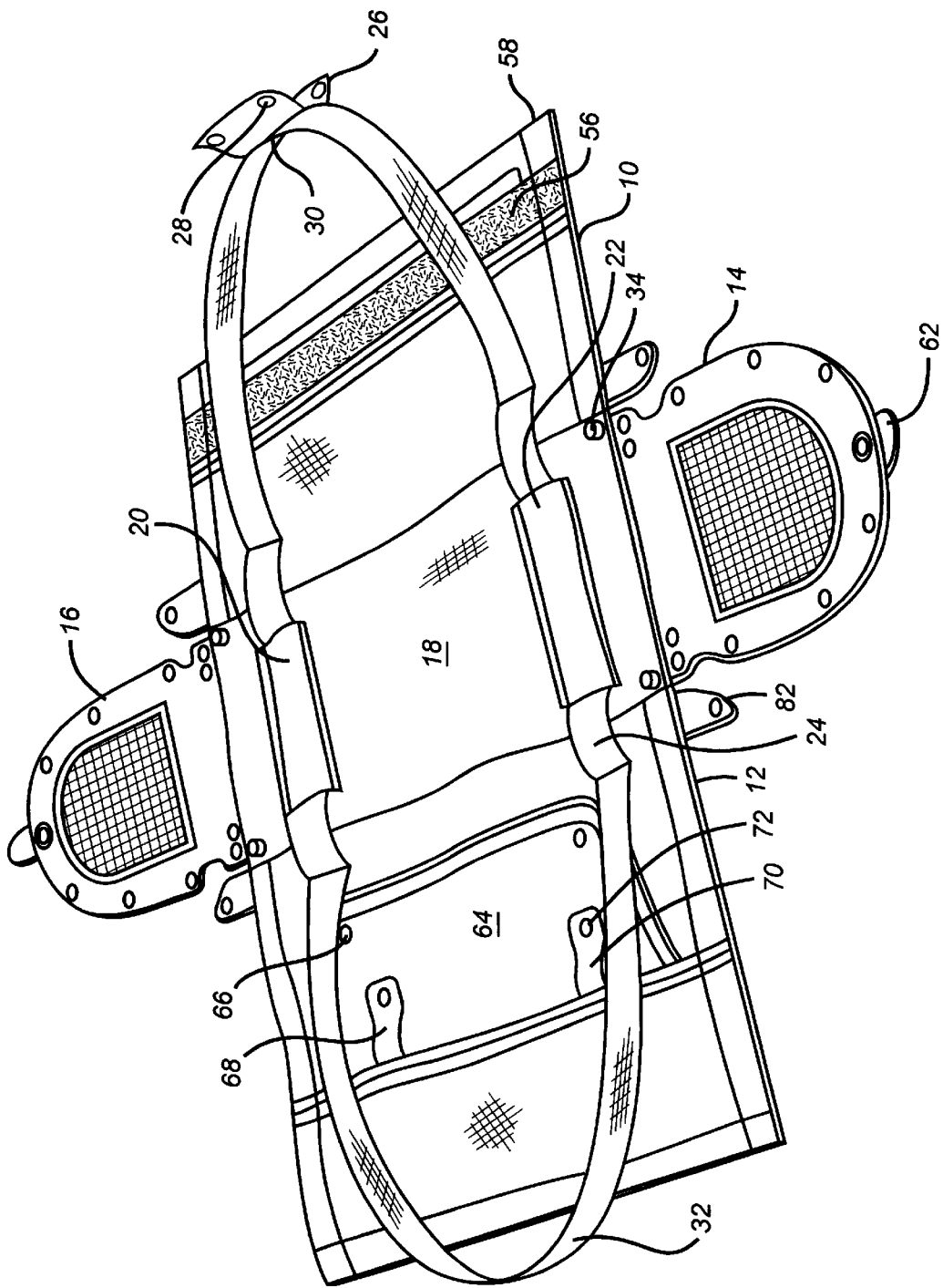
FIG. 2 is a bottom view of the carrier spread on a flat surface.
Figure 3:
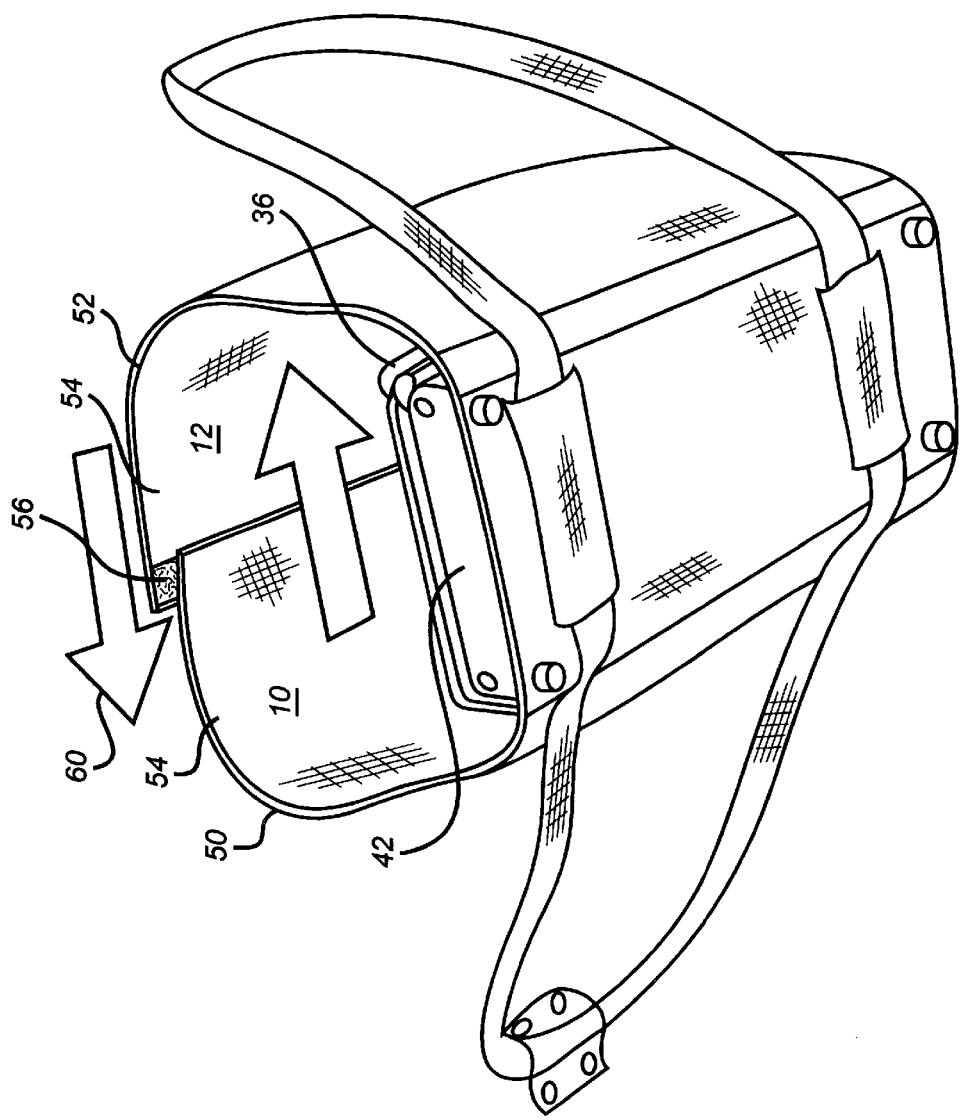
FIG. 3 is a perspective view of the carrier with the sidewalls partly collapsed on top of the folded endwalls.
Figure 7:
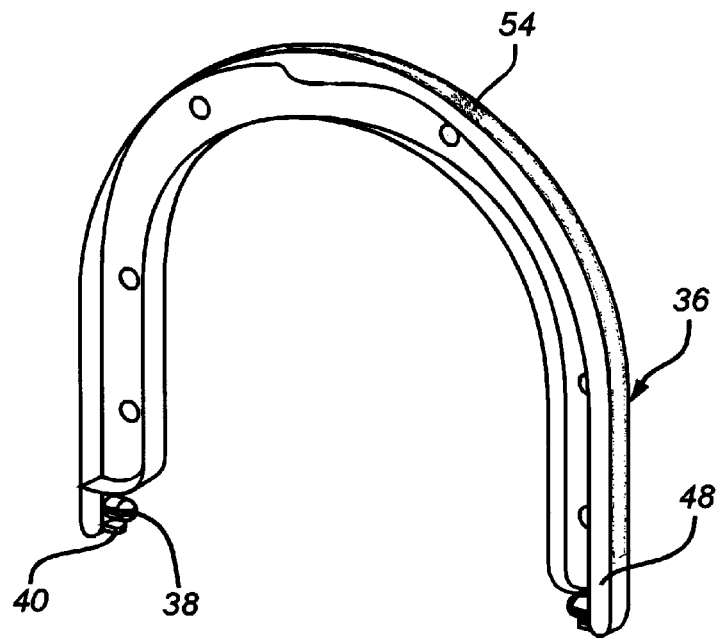
FIG. 7 is a perspective view of the structural component of one of the endwalls.
Figure 8:
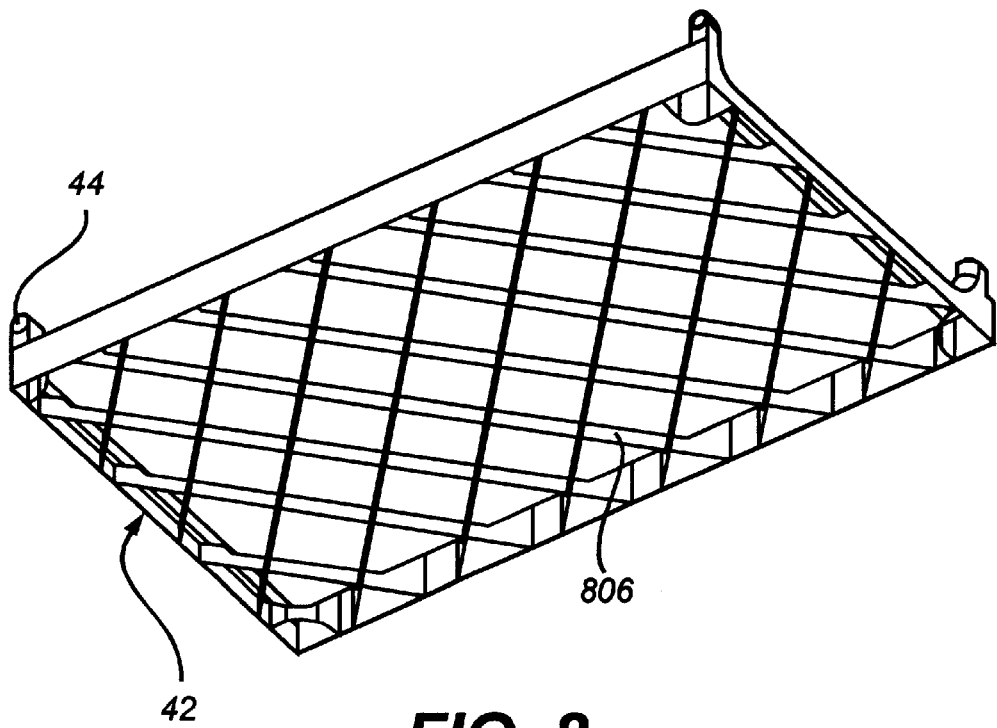
FIG. 8 is a perspective view of the internal tray which supports the endwalls through a pivotal connection with the structure shown in FIG. 7.

FIG. 2 also illustrates that the fabric endwalls 14 and 16 form an extension of the bottom 18. Each of the endwalls 14 and 16 has a structural component illustrated in perspective in FIG. 7. The U-shaped structure 36 has a pair of opposed pivots 38 and a travel stop 40 associated with each pivot 38. Other endwall shapes are within the scope of the invention. Referring to FIG. 8, a tray 42 has sockets 44, each of which accepts a pivot 38 from the structure 36 shown in FIG. 7. Referring to FIG. 1, a series of fasteners 46 secures the endwalls 14 or 16 to the structural component 36 shown in FIG. 7. By virtue of the fasteners 46 which connect the fabric endwalls 14 and 16 to the structure 36, the tray 42 remains secured to the bottom 18. Tray 42 can be separately secured to bottom 18. The folded position of the structure 36 over the tray 42 is illustrated in FIG. 3 when the pet carrier P is being collapsed for storage. In the view of FIG. 3, the structure 36 is parallel to the tray 42 to facilitate the collapse of the sidewalls 10 and 12 over the folded endwalls 14 and 16.

Referring again to FIG. 7, the structure 36 has a support surface 48 which runs on its exterior. Referring to FIG. 3, edges 50 and 52 of sidewalls 10 and 12 are positioned to rest on surface 48 and be fastened to it, preferably by a known type of fastener such as a hook and loop, shown schematically as 54. While only one side is shown, the attachment of the sidewalls 10 and 12 to the other structure 36 (not shown) is preferably identical. In that way, when the endwalls 14 and 16 are turned to a vertical position, as determined by travel stop 40, the sidewalls 10 and 12 can be wrapped around quickly and secured to the endwalls 14 and 16 by the hook and loop attachment 54. The sidewalls 10 and 12 also are secured to each other by a hook and loop arrangement, shown schematically as 56. The hook and loop arrangement 56 is located adjacent ends 58 and 60 of sidewalls 10 and 12 (see FIGS. 2 and 3). A pull tab 62 is located at the top of each of the endwalls 14 and 16 to facilitate rotation the endwalls 14 and 16 from the folded position shown in FIG. 3 to the erect position shown in FIG. 1. Once the endwalls 14 and 16 are pulled to the point where travel stop 40 prevents further rotation, the endwalls 14 and 16 are now in position to have the sidewalls 10 and 12 picked up around the structure 36 and secured to the structure 36 by hook and loops 54. Thereafter, the top of the pet carrier P is secured by attaching sidewalls 10 and 12 together through hook and loop 56. Thereafter, the ends 30 and 32 are adjoined under the handle 26 and the snaps 28 are fastened. The pet carrier P is now ready to transport the pet inside. A firm pull on tab 62 with the pet carrier P in the assembled condition will pull down an end wall, such as 14, when the fabric separates from structure 36. The pet can be inserted or removed in this manner, as opposed to undoing hook and loop 56.

Referring to FIG. 2, a fabric flap 64 can be held down with snaps 66 or it can be rolled up and secured using straps 68 and 70, each of which has a snap 72.

Figure 6:
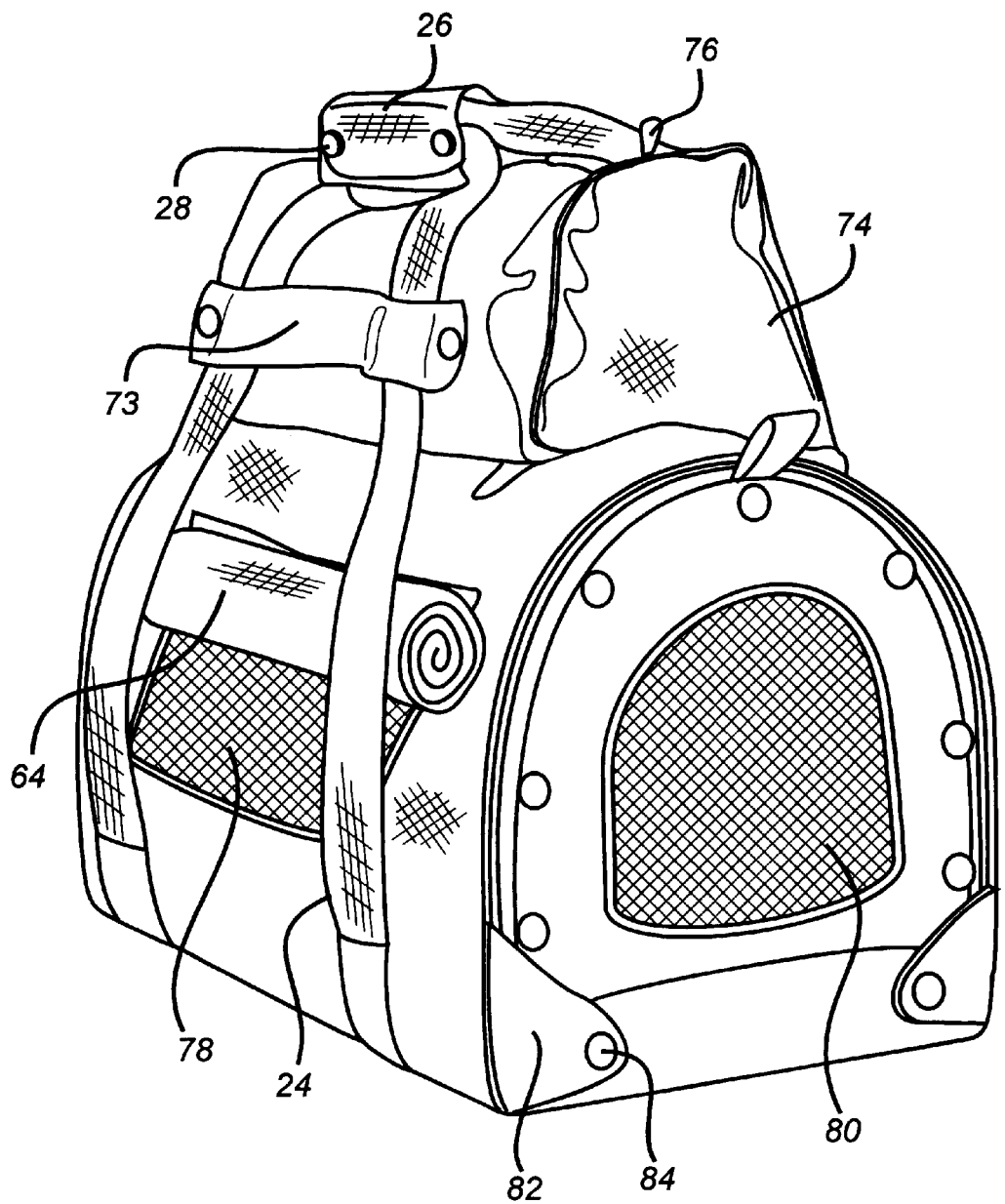
FIG. 6 is a perspective view of the pet carrier, showing the optional pouch incorporated into the handle system.

FIG. 6 illustrates the strap 24 being sufficiently tall so as to extend through loops 73 of a carrying pouch 74. The straps 24 then are secured to each other by the handle 26 using snaps 28 in the manner previously described. The loops 73 keep the pouch 74 from sliding between ends 14 and 16. A zipper 76 provides access to pouch 74. FIG. 6 also illustrates the flap 64 in the rolled-up position, exposing an open mesh 78 which allows ventilation. Also illustrated in FIG. 6 is an open area of mesh 80 for further cross-ventilation through the pet carrier P. In the embodiment illustrated, the end-walls 14 and 16 each have the open area mesh 80.

To further retain the endwalls 14 and 16 to the sidewalls 10 and 12, flaps 82, which extend from the junction of bottom 18 and sidewalls 10 and 12, can be used in conjunction with snap 84 to snap together the sidewalls 10 and 12 adjacent the lower end of endwalls 14 and 16. Snap 84 snaps into structure 36.

Referring to FIG. 8, the internal tray 42 comprises a diamond-shaped grid 806 on top of which a floor (not shown) is placed for the pet to sit or stand on. The tray 42 and the structure 36 are made of lightweight plastic materials, and the pet carrier P has preferably fabric components, allowing the entire assembly to be easily washed in a washing machine.

Figure 4:
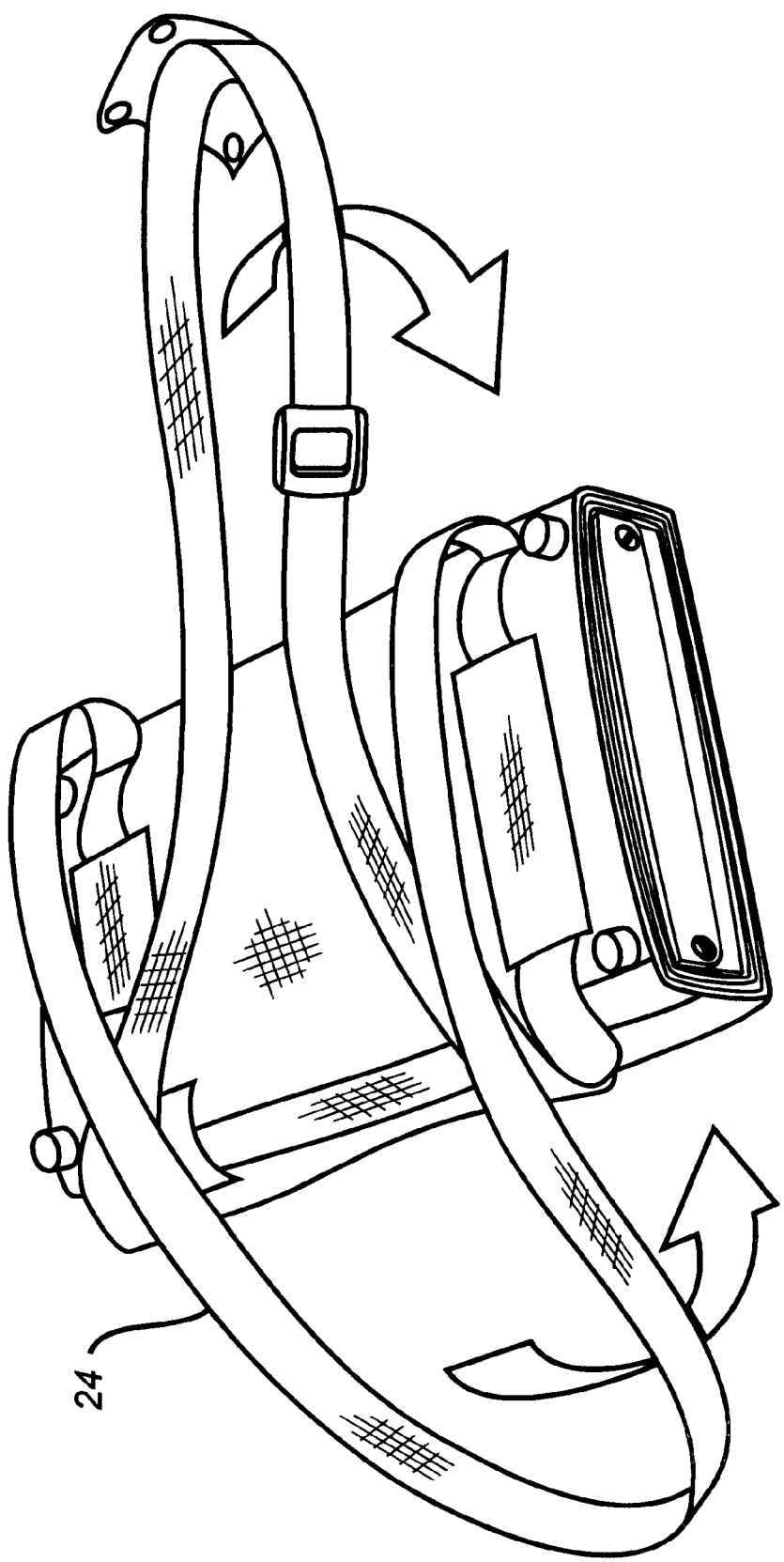
FIG. 4 is a perspective view showing the sidewalls completely folded and the handles being wrapped to secure the folded sidewalls to the base.
Figure 5:
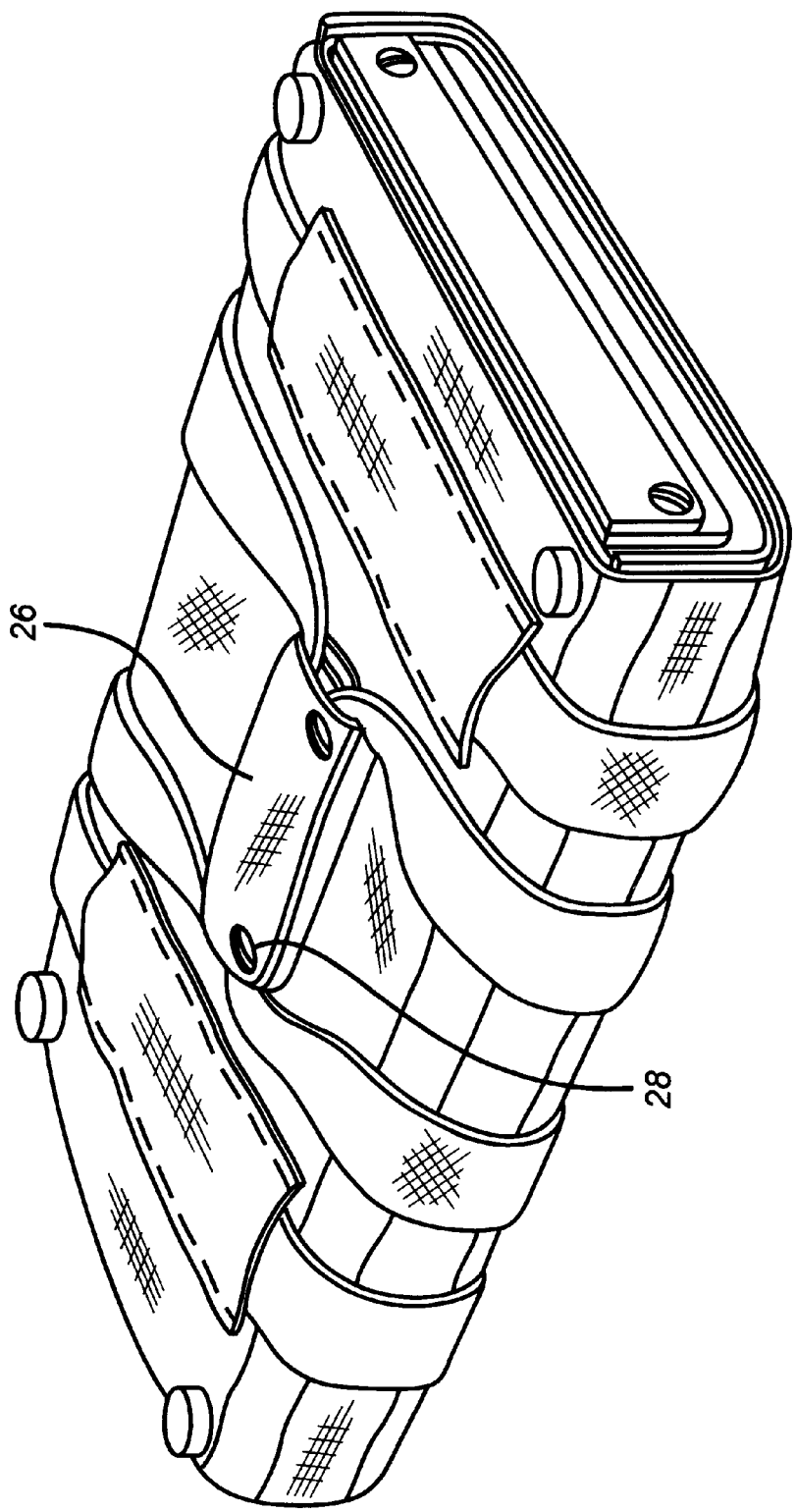
FIG. 5 shows the package completely folded with the handles secured around it to hold it together.

FIG. 4 and 5 illustrate how the strap 24 can be wrapped around the sidewalls 10 and 12 after the endwalls 14 and 16 have been folded down to the tray 42. The handle 26, as shown in FIG. 5, can be used to secure the ends 30 and 32 of the strap 24 so that the package is at its minimum volume for easy and convenient storage.

Figure 9:
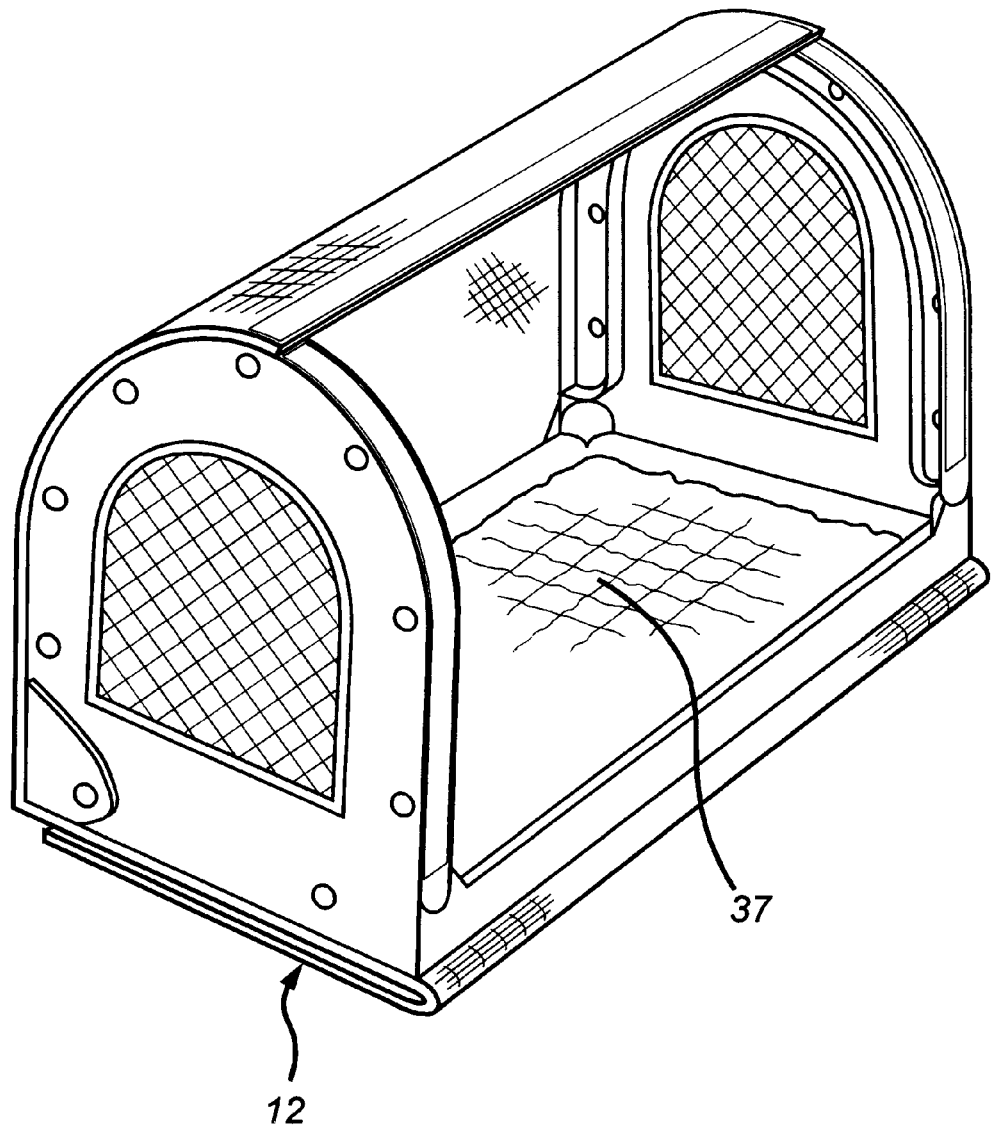
FIG. 9 is a perspective view of the carrier used as a bed.

FIG. 9 illustrates sidewall 12 folded under bottom 18 leaving an open side so the pet carrier P can be used as an animal bed. A pad 37 can be put on tray 42. This pad can be a removable plush pad or can incorporate a moisture absorbing material which can soak up sweat or urine in an amount in excess of its own weight. These materials are commonly used in diapers.

Those skilled in the art will appreciate that what has been disclosed is a unique pet carrier P which is lightweight and easy to assemble and disassemble. Despite its light weight through the use of hook and loop fasteners 54 and 56, the overall design is sufficiently rugged to safely contain the pet within the carrier P. The pet is easily inserted or removed through a top opening 86 using the hook and loop connection 56. The strap 24 can be made sufficiently long to accommodate a pouch 74 to carry pet-related or owner-related supplies. Ventilation is provided through openings through mesh 78 or 80. The collapsibility of the design allows many units to be displayed for retail vending in a very compact space, with one or two units shown in the position of FIGS. 1 or 6 for demonstration purposes. Many materials can be used for the endwalls and sidewalls without departing from the spirit of the invention. A lightweight, scuff-resistant material is preferred. Other materials can include breathable natural and/or synthetic fabrics which will allow air flow but will exclude precipitation. One such fabric is sold under the trademark Gortex®.

The foregoing disclosure and description of the invention are illustrative and explanatory thereof, and various changes in the size, shape, and materials, as well as in the details of the illustrated construction, may be made without departing from the spirit of the invention.

What is claim is:

1. A pet carrier, comprising:

a bottom;

a pair of end panels movably mounted to said bottom for movement between a collapsed position where said end panels are aligned with said bottom and an erect position for use in carrying a pet;

a pair of sidewalls selectively securable to said end panels when said end panels are in said erect position to complete the enclosure for the pet;

said end panels are pivotally mounted to said bottom;

said bottom further comprising a base;

said end panels comprising a structural frame comprising a pair of pivots, the structural frame for each panel being pivotally mounted to said base with said pivots to allow said end panels to pivot down towards said base and so that said structural frames can transmit the weight of the sidewalls through the structural frame and into the base;

said structural frame in said end panels acting as a support for said sidewalls when said end panels are in said erect position.

2. The carrier of claim 1, wherein:

said end panels are selectively removable from said structural frame for access to the pet.

3. The carrier of claim 1, wherein:

said sidewalls are foldable over said end panels when said end panels are in said collapsed position.

4. The carrier of claim 3, wherein:

said sidewalls comprise opposed material segments which extend from said bottom which have no structural components, said segments supported by said end panels when said end panels are in said erect position.

5. The carrier of claim 4, wherein said material segments releasably secured to said frame.

6. The carrier of claim 5, wherein:

said material segments secured to said frame by hook and loop attachment.

7. The carrier of claim 6, wherein:

said segments securable to each other to form a closure for insertion or removal of the pet.

8. The carrier of claim 7, wherein:

said closure formed by a hook and loop connection.

9. The carrier of claim 1, further comprising:

a strap assembly passing under said bottom for support thereof and having a pair of end areas;

a handle to releasably secure said end areas so as to function as a grip.

10. The carrier of claim 9, wherein:

said strap assembly wrapping around said sidewalls when said sidewalls are placed on said end panels when said end panels are in said collapsed position;

said handle securing said strap assembly around said sidewalls to secure said sidewalls and end panel to said bottom for storage of the pet carrier.

11. A pet carrier, comprising:

a bottom;

a pair of end panels movably mounted to said bottom for movement between a collapsed position where said end panels are aligned with said bottom and an erect position for use in carrying a pet;

a pair of sidewalls selectively securable to said end panels when said end panels are in said erect position to complete the enclosure for the pet;

a strap assembly passing under said bottom for support thereof and having a pair of end areas;

a handle to releasably secure said end areas so as to function as a grip;

a carrying pouch supported by said sidewalls, said strap assembly passing through loops on said pouch to keep it secured to said sidewalls.

12. The carrier of claim 1, wherein:

said end panels comprise a fabric supported on said structural frame having a mesh opening; and at least one mesh opening on said sidewalls and a flap for selectively opening or closing said mesh opening on said sidewalls.

13. The carrier of claim 6, wherein:

said hook and loop extending on said edges of said material segments and said frame so as to engage said structural frame substantially along the edges of said material segments.

14. The carrier of claim 8, further comprising:

a strap assembly passing under said bottom for support thereof and having a pair of end areas;

a handle to releasably secure said end areas so as to function as a grip.

15. The carrier of claim 14, wherein:

said strap assembly wrapping around said sidewalls when said sidewalls are placed on said end panels when said end panels are in said collapsed position;

said handle securing said strap assembly around said sidewalls to secure said sidewalls and end panel to said bottom for storage of the pet carrier.

16. The carrier of claim 15, wherein:

said hook and loop extending on said edges of said material segments so as to engage said structural frame along substantially the edges of said material segments.

17. A pet carrier, comprising;

a bottom;

a pair of end panels movably mounted to said bottom for movement between a collapsed position where said end panels are aligned with said bottom and an erect position for use in carrying a pet;

a pair of sidewalls selectively securable to said end panels when said end panels are in said erect position to complete the enclosure for the pet;

said sidewalls are foldable over said end panels when said end panels are in said collapsed position;

said sidewalls comprise opposed material segments which extend from said bottom which have no structural components, said segments supported by said end panels when said end panels are in said erect position;

said end panels each comprise a structural frame comprising a pair of pivots;

said material segments releasably secured to said frame;

said material segments secured to said frame by hook and loop attachment;

said segments securable to each other to form a closure for insertion or removal of the pet;

said closure formed by a hook and loop connection;

a strap assembly passing under said bottom for support thereof and having a pair of end areas;

a handle to releasably secure said end areas so as to function as a grip;

said strap assembly wrapping around said sidewalls when said sidewalls are placed on said end panels when said end panels are in said collapsed position;

said handle securing said strap assembly around sidewalls to secure said sidewalls and end panel to said bottom for storage of the pet carrier;

a tray mounted to said bottom, the tray having a pair of sockets at opposite ends;

the structural frame of each of said end panels is pivotally mounted to said tray at a respective pair of sockets of said tray to allow said end panels to pivot down toward said tray and so that said structural frames can transmit the weight of the sidewalls through the structural frame and into the tray;

said hook and loop extending on said edges of said material segments so as to engage said structural frame along substantially the edges of said material segments;

said end panels comprise a fabric supported on said structural frame having a mesh opening; and at least one mesh opening on said sidewalls and a flap for selectively opening or closing said mesh opening on said sidewalls.

18. The carrier of claim 17, wherein:

a carrying pouch supported by said sidewalls, said strap assembly passing through loops on said pouch to keep it secured to said sidewalls.

19. The carrier of claim 4, wherein:

one of said material segments can be supported by said end panels while another is folded leaving a side entry into the carrier for use as a pet bed.

20. The carrier of claim 1, further comprising:

a pad mounted on said tray which incorporates a material which soaks up fluids in excess of its own weight.

21. The carrier of claim 1, wherein:

said end panels comprise a material component selectively releasable from said structural frame to facilitate ingress or egress of a pet.

* * * * *